(12) United States Patent
Huttunen

(10) Patent No.: US 6,865,165 B1
(45) Date of Patent: Mar. 8, 2005

(54) METHOD FOR CONTROLLING LOAD IN A TELECOMMUNICATION SYSTEM

(75) Inventor: Kari Huttunen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/529,991

(22) PCT Filed: Aug. 31, 1999

(86) PCT No.: PCT/FI99/00707
§ 371 (c)(1), (2), (4) Date: Apr. 24, 2000

(87) PCT Pub. No.: WO00/13378
PCT Pub. Date: Mar. 9, 2000

(30) Foreign Application Priority Data

Sep. 1, 1998 (FI) .................................................. 981866

(51) Int. Cl.[7] ........................... H04Q 7/00; H04B 7/212
(52) U.S. Cl. ........................ 370/329; 370/337; 455/453
(58) Field of Search ................................. 370/229, 235, 370/329, 321, 322, 328, 337, 862, 468, 230.1; 455/453, 423, 464, 450, 452, 422, 11.1; 709/105

(56) References Cited

U.S. PATENT DOCUMENTS 5,784,362 A * 7/1998 Turina ........................... 370/321
5,835,490 A 11/1998 Park et al.
6,031,832 A * 2/2000 Turina ........................... 370/348
6,356,759 B1 * 3/2002 Mustajarvi ..................... 455/450
6,529,497 B1 * 3/2003 Hjelm ........................... 370/347

FOREIGN PATENT DOCUMENTS

| FI | 96/60542 | 8/1999 |
| WO | 97/16040 | 5/1997 |
| WO | 97/29610 | 8/1997 |

* cited by examiner

Primary Examiner—Duc Ho
(74) Attorney, Agent, or Firm—Pillsbury Winthrop LLP

(57) ABSTRACT

The invention relates to a method for controlling load in a telecommunication system comprising a network part, at least one subscriber terminal and a telecommunication connection between the network part and the subscriber terminal, in which method the telecommunication connection is used for connection setup and data transfer, the telecommunication connection comprising a channel for relaying channel allocation requests transmitted by the subscriber terminal to the network part. The invention is characterized in that the telecommunication system load is controlled by adjusting the capacity of the channel used for relaying the channel allocation requests.

14 Claims, 3 Drawing Sheets

METHOD FOR CONTROLLING LOAD IN A TELECOMMUNICATION SYSTEM

FIELD OF THE INVENTION

Figure 1:
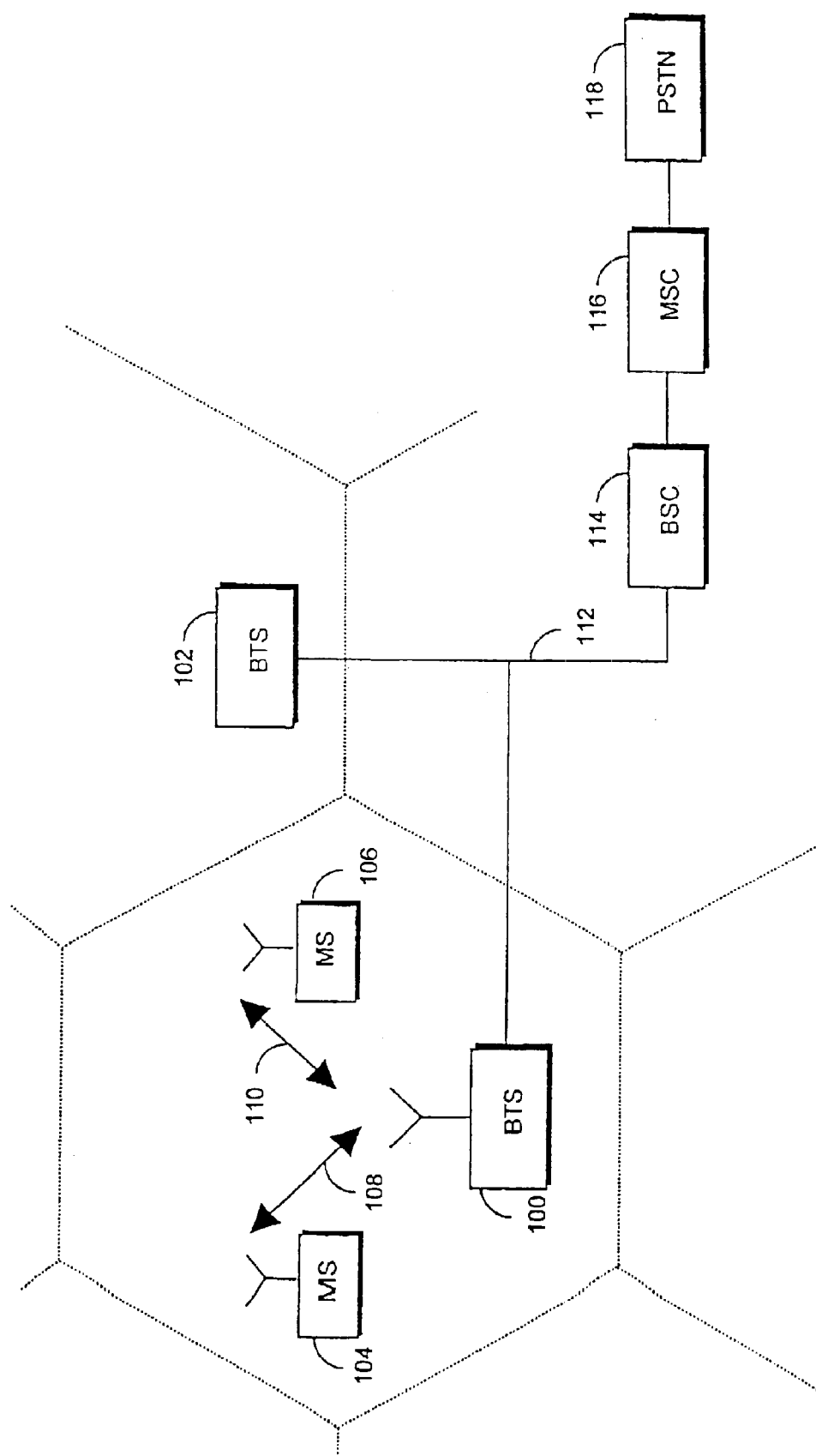

The invention relates to a method for controlling load in a telecommunication system comprising a network part, at least one subscriber terminal and a telecommunication connection between the network part and the subscriber terminal, in which method the telecommunication connection is used for connection setup and data transfer, the telecommunication connection comprises a channel for relaying channel allocation requests transmitted by the subscriber terminal to the network part.

The invention further relates to a telecommunication system comprising a network part, at least one subscriber terminal and a telecommunication connection between the network part and the subscriber terminal, in which method the telecommunication connection is used for connection setup and data transfer, the telecommunication connection comprises a channel for relaying channel allocation requests transmitted by the subscriber terminal to the network part.

BACKGROUND OF THE INVENTION

A packet radio system refers to a radio system employing packet switched technique known from the fixed networks. Packet switching is a method wherein a connection is set up between the users by transmitting data in packets that comprise address and control information. A plurality of connections can simultaneously use the same transmission link. Research has been carried out particularly on the use of the packet switched radio systems since the packet switching method is well suited for data transmission wherein data to be transmitted is generated in bursts. Consequently, the data transmission link does not have to be continually allocated, only for transmitting the packets. Cost and capacity can thus be considerably saved both when the network is being built and used. The present packet radio networks are particularly attractive to the further development of the global system for mobile communication GSM, known as a general packet radio service GPRS.

The present invention relates to a method and a telecommunication system by means of which a base station system in accordance with the GPRS system can control its load level in a controlled way such that the telecommunication system is not subjected to overload. In the GPRS system, load in the base station system of the telecommunication system is mainly directly or indirectly caused by channel allocation requests transmitted by the subscriber terminals to the mobile telephone network. It is previously known to prevent overload by a flow control procedure, for example, by means of which the other party can be restrained from transmitting more data than the system can receive and process. An example of how to restrict the subscriber terminal's capability to make channel allocation requests in this way is to clearly prohibit the terminal from trying to reserve radio resources dung a given period of time after the subscriber terminal has already transmitted a channel allocation request to the network. If, for example, all channels in a base station are already in use, the base station controller can transmit a "reject" type of message to the subscriber terminal, which has already transmitted a channel allocation request to the network. The "reject" message can, for example, indicate the time after which the subscriber terminal is allowed to retry channel reservation at the earliest.

A second previously known method for controlling load is an experimental study to find out how high channel allocation request load a base station can tolerate. The next step is to provide a filtering algorithm which starts filtering off the channel allocation requests when a given predetermined load limit is exceeded.

A third way to limit the channel allocation requests is to parametrize the base station system in a suitable manner. The base station system can, for example, change its system parameter information over the broadcast control channel BCCH and thus affect the subscriber terminals' capability to make channel allocation requests. "Random access channel RACH control parameter" system parameter information can affect, for example, whether channel allocation requests can be made to a cell at all or whether only channel allocation requests of certain access control classes are allowed. It is also feasible, for example, to prevent emergency calls from being made via a cell, and to affect the repetition frequency at which channel allocation requests are allowed to be made. Furthermore, it is also possible to affect the number of retries allowed in case the subscriber terminal does not receive a response to its channel allocation request from the mobile telephone network at its first attempt.

The systems described above suffer from the following problems. In the first method, the base station system may, in principle, receive simultaneously so many channel allocation requests from the subscriber terminals that the base station system does not have the time to react sufficiently quickly to the situation, but the system becomes overloaded. The method thus cannot restrict the effort to try channel reservation from subscriber terminals that have not even tried channel reservation.

Since the second method requires empirical study into an already operating system, a suitable filtering algorithm cannot be provided in advance. The suitable limit must therefore be found experimentally. The method can only restrict load generated by channel allocation requests, therefore load caused by other functions cannot be taken into account in the filtering algorithm. Mere filtering off a channel allocation request also quickly generates new channel allocation requests to the same base station since the subscriber terminal, failing to receive an appropriate response to its first request, will retry channel reservation. This further increases the number of channel allocation requests to be received.

Depending on the situation, the third method applies different principles when allocating radio resources to different types of subscribers, rather than trying to prevent the base station system from becoming physically loaded.

BRIEF DESCRIPTION OF THE INVENTION

An object of the invention is to provide a method and a system implementing the method so as to enable the above-mentioned problems to be solved. This is achieved by a method described in the introduction, the method being characterized by controlling the telecommunication system load by adjusting the capacity of the channel used for relaying the channel allocation requests, and by a telecommunication system which is characterized in that the telecommunication system is arranged to control load by adjusting the capacity of the channel used for relaying the channel allocation requests.

The preferred embodiments of the invention are disclosed in the dependent claims.

In the GPRS system, base station system load is thus, directly or indirectly, mainly caused by channel allocation requests transmitted by the subscriber terminals to the mobile telephone network. If, in the GPRS system area, more channel allocations take place than the system is capable of processing, the number of new channel allocations can be restricted in the manner according to the invention.

The GPRS system defines a packet random access channel RACH for transmitting these channel allocation requests to the network. Adjusting the PRACH channel capacity in accordance with the invention is dynamically carried out in the following manner. When the base station system becomes overloaded, the PRACH channel capacity is decreased. Fewer channel allocation requests can thus be made to the network. Consequently, the load drops to a level tolerated by the network, and no overload occurs. When the load level drops sufficiently low, the PRACH channel capacity can again be increased. According to a preferred embodiment, the processor load of the base station system or the signalling load between the base station and the base station controller, for example, is continually measured.

The method described above can be utilized either in a base station or a base station controller, or both. If the method is utilized in the base station, the method aims to prevent the base station from becoming overloaded. If the method is utilized in the base station controller, the method aims to prevent the base station controller from becoming overloaded. If the method is utilized both in the base station and the base station controller, the method aims to prevent the base station system from becoming overloaded.

The method and system of the invention provide several advantages. By means of the method and the telecommunication system, the GPRS system can control its load level in a controlled manner such that the system does not become overloaded.

A great advantage is speed. With the method of the invention, the base station system can quickly, while operating, block the whole uplink PRACH capacity out from the base station if necessary, in which case the subscriber terminal no longer can transmit further channel allocation requests to the base station. Too high a load level can thus be detected before the base station system becomes overloaded. Hence, each subscriber terminal does needs not be separately forbidden to try entering a cell but the effort itself is blocked or restricted.

The method of the invention may also necessitate empirical study in order to find a suitable adjustment algorithm. It is, however, easier to find the suitable algorithm since a full load level of the signalling link between the processor unit or the base station and the base station controller can be used directly as the source. Consequently, also processing load caused by other functions affects the point of time when the process of decreasing the PRACH channel capacity is started. Similarly, since decreasing the PRACH channel capacity affects the subscriber terminal's capability of transmitting channel allocation requests, decreasing the PRACH channel capacity does not necessarily increase the number of reallocation requests made to the cell, unlike mere filtering off a channel allocation request does.

Neither does the method of the invention aim to apply different principles to allocating radio resources to different types of subscribers in load situations, but rather to control the loading process and prevent the system from becoming physically overloaded.

The method of the invention is particularly good when employed in a cell to which a high PRACH capacity is configured. Such a configuration is subjected to extremely high performance requirements. Since all different base station system product generations do not necessarily have sufficient physical capacity to control such configurations, a multi-purpose load restricting method is useful over a radio path.

The method of the invention is good because it adopts dynamically to a situation, also taking into account the overall load situation than merely the load caused by channel allocations. Furthermore, the system can be made to rather quickly moderate the number of channel allocation requests received, thus giving the system some time to react even to sudden load peaks subty and sufficiently quickly.

The system of the invention shares the advantages described above in connection with the method. It is obvious that the preferred embodiments and the detailed embodiments can be combined into different combinations in order to achieve a desired technical capacity.

BRIEF DESCRIPTION OF THE INVENTION

Figure 2:
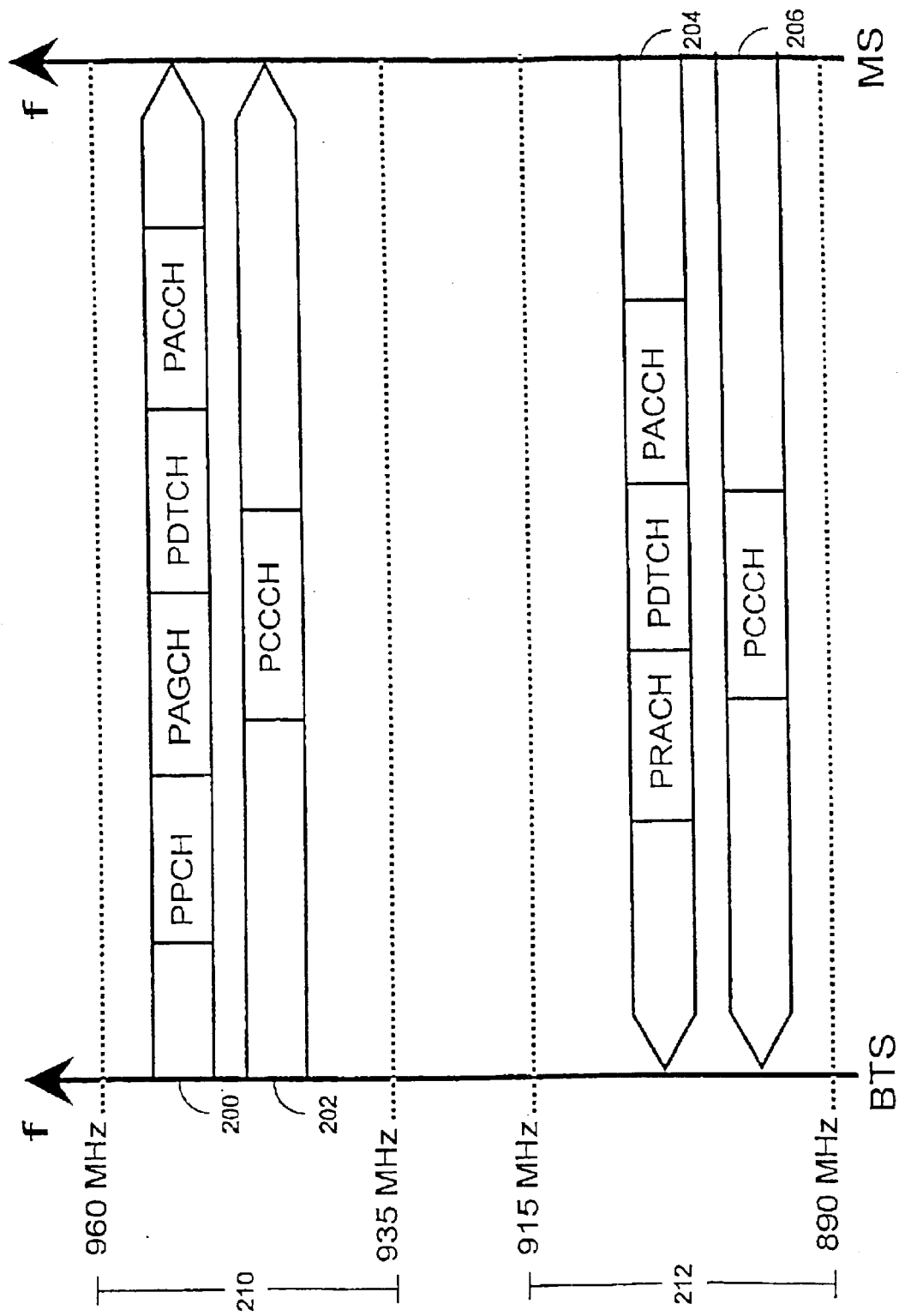
Figure 3:
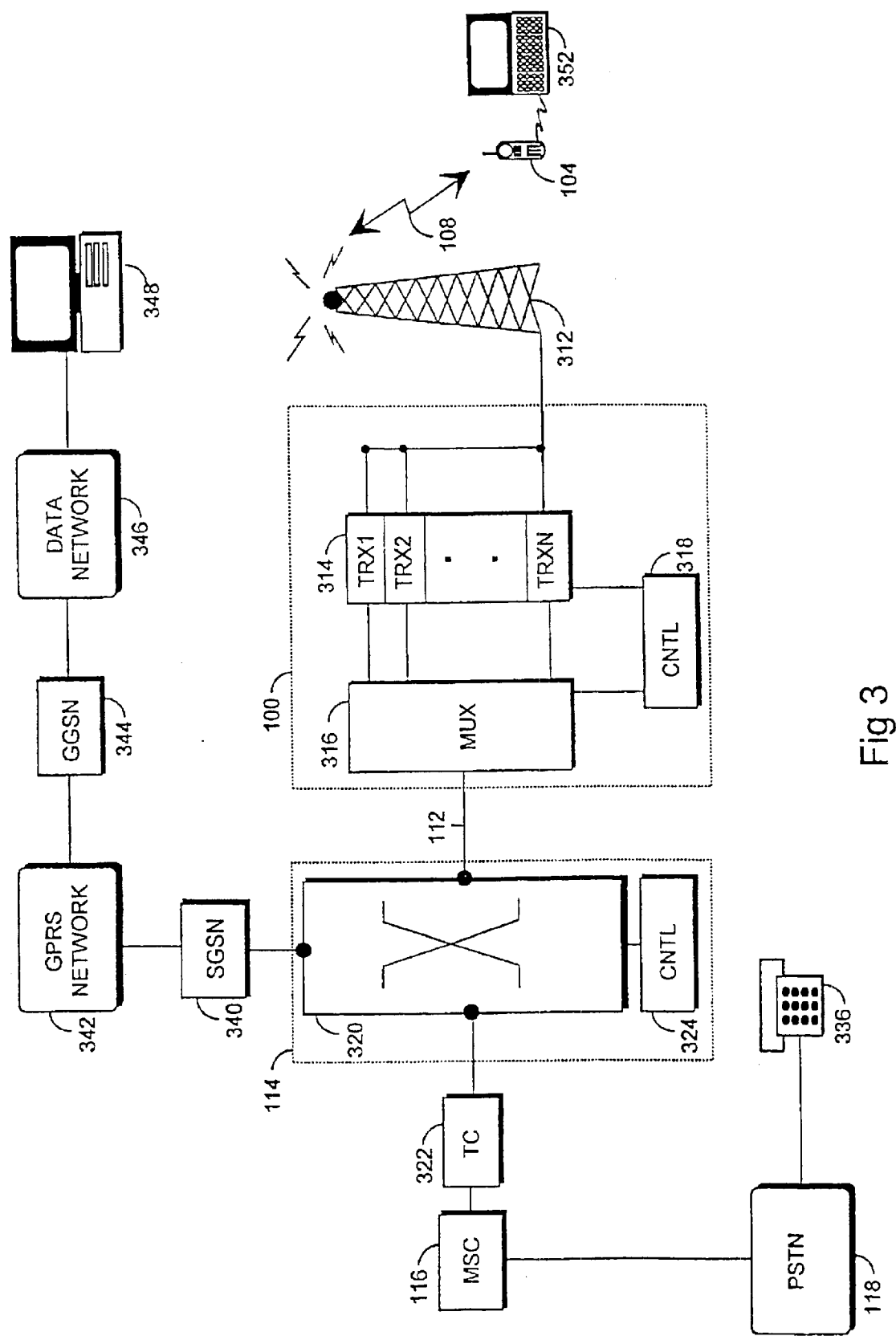

The invention is now described in closer detail in connection with the preferred embodiments with reference to the accompanying drawings, in which FIG. 1 shows a cellular radio network, FIG. 2 shows a radio connection's physical channels and logical channels transferred in the physical channels, and FIG. 3 is a block diagram of the cellular radio network illustrating how a base station and a base station controller are connected to a packet transmission network.

DETAILED DESCRIPTION OF THE INVENTION

The invention is suited for use in GSM-based cellular radio networks, such as the basic GSM cellular network and networks further developed therefrom, in GSM1800 and GSM1900 systems, for example, wherein data transfer is carried out using a general packet radio service GPRS. Data transmission is thus performed in a packet form.

FIG. 1 shows an example of the structure of a basic cellular radio network. In FIG. 1, base stations 100, 102 comprise a hexagonal coverage area, i.e. a cell. The base stations 100, 102 are connected to a base station controller 114 via a connection line 112. The base station controller 114 serves to control the operation of a plurality of the base stations 100, 102. Usually, the base station controller 114 is connected to a mobile services switching centre 116, which is further connected to a fixed telephone network 118. In office systems, the operations of the base station 100, the base station controller 114 and even the mobile services switching centre 116 can be connected to one device, which is then connected to the fixed network 118, to a switching centre of the fixed telephone network 118, for example. Subscriber terminals 104, 106 located in the cell have a radio connection 108, 110 to the base station 100 of the cell. Additionally, the network part, i.e. the fixed part of the cellular radio network, can comprise further base stations, base station controllers, transmission systems and network management systems of different levels. It is obvious to those skilled in the art that the cellular radio network also comprises various other structures that need not be explained here.

The radio connection 108 is implemented using physical channels. In the GSM, a physical channel is one time slot of a 200 kHz wide frequency band, for example. FIG. 2 shows necessary channels for the radio connection 108 in a simplified manner. The frequency band of the GSM system is depicted on the vertical axis, the base station 100 is on the left in the figure and the subscriber terminal 104 is situated on the right. A lower frequency band 212 is used on the uplink, i.e. form the subscriber terminal 104 to the base station 100 in the direction of transmission. In the GSM, the lower frequency band 212 comprises the frequency range 890–915 MHz. An upper frequency band 210 is used on the downlink, i.e. from the base station 100 to the subscriber terminal 104 in the direction of transmission. Only some part of the frequency bands are allocated to the network operator, a 5 MHz wide frequency band, for example, which is divided into 200 kHz wide carrier waves, each carrier wave normally comprising eight time slots. In this presentation, the time slots are called a physical channel. When transferring speech, for example, there are normally two physical channels in use as traffic channels: one downlink channel 202 and one uplink channel 206.

The GPRS standard defines the physical structure of a packet data channel PDCH. As shown by FIG. 2, a logical packet common control channel PCCCH can be configured for such a PDCH resource both to the uplink and downlink physical traffic channels 202, 206. Such a PDCH resource, which contains the logical PCCCH channel, is divided into an uplink resource and a downlink resource. The uplink resource can be allocated between the PRACH channel, a packet data traffic channel PDTCH and a packet associated control channel PACCH as defined in the standard. A given part of the uplink resource that has not been fixedly allocated to the PRACH channel can be dynamically allocated to the PRACH, PDTCH and PACCH channels. The part assigned to the PRACH channel is then indicated by means of the downlink PCCCH resource. An uplink state flag USF is relayed to the radio path in each downlink radio block of a packet data channel containing a PCCCH channel. If this USF information has a given predetermined idle mode value "FREE" in the downlink radio blocks, it indicates that the next uplink block in turn is allowed to be used as the PRACH channel. Hence, the USF information transmitted to the radio path can thus be used for dynamically controlling which part of the uplink resource is the PRACH channel and which part is the PDTCH and PACCH channel at a given time. The downlink resource, again, can be allocated between a packet paging channel PPCH, a packet access grant channel PAGCH, the PDTCH channel and the PACCH channel as defined in the standard. If the downlink block USF information has another value than a given predetermined idle mode value, the USF information can be used for controlling the uplink packet traffic, i.e. the PDTCH and PACCH channel packet traffic, of the subscriber terminal allocated to the PDCH resource concerned.

In the solution of the invention, the USF information transmitted in the downlink blocks is only provided with a given predetermined idle mode value, not because the next uplink block would be used as the PDTCH or PACCH channel but because the aim is to prevent the subscriber terminals located in the cell's area from being able to use the next uplink block as the PRACH channel. Logically considered, the USF field is thus given another value than a given predetermined idle mode value, in other words it is given a "NOT FREE" value. In a preferred embodiment of the invention, the USF information is used when it obtains another value than a given predetermined idle mode value for the radio interface PRACH flow control, not for controlling the packet connections allocated to it.

Since the PRACH channel capacity can thus be dynamically decreased by controlling the USF, fewer channel allocation requests can be made to the loaded base station system, and, consequently, no overload follows. When the base station system load level drops sufficiently, the PRACH channel capacity can again be increased by means of the USF.

Referring to FIG. 3, a typical structure of a cellular radio network of the invention and the connections thereof to a fixed telephone network 118 and a packet transmission network 342 are described. A base station controller 114 is connected to a base station 100. The base station controller 114 is also connected to a mobile services switching centre 116. The mobile services switching centre 116 is responsible for implementing a connection field, controlling connection setup and release, collecting charging information and controlling echo cancellation equipment, for example.

The base station controller 114 monitors and controls a group of base stations 100. Typically, one base station controller 114 is provided per a few dozen or hundred base stations 100. The base station controller 114 comprises a group switch 320 and a control unit 324. The group switch 320 is used for connecting speech and data and for connecting signalling circuits. The control unit 324 carries out call control, mobility management, collecting statistical information and signalling. A transcoder 322 located between the base station controller 114 and the mobile services switching centre 116 converts the different digital speech coding forms used between the public telephone network 118 and the mobile telephone network into mutually compatible forms.

The base station 100 comprises transceivers 314. The base station 100 typically comprises 1 to 16 transceivers 314. One transceiver 314 provides one TDMA frame, in other words typically eight time slots, with radio capacity. The base station 100 also comprises a control unit 318, which controls the operation of the transceiver 314 a multiplexer 316. The multiplexer 316 is used for placing the traffic channels and control channels used by a plurality of the transceivers 314 over one transmission link 112. The structure of the transmission link 112 is clearly defined, and it is called Abis interface.

The transceivers 314 of the base station 100 are connected to an antenna unit 312, by which a radio connection 108 to a subscriber terminal 104 is implemented. The structure of frames transmitted over the radio connection 108 is also clearly defined, and it is called a radio interface.

The subscriber terminal 104 can be, for example, a common GSM mobile telephone, and a portable computer 352, for example, which can be used in packet transmission for ordering and processing the packets, can be connected to the subscriber terminal by an extension card.

The group switch 320 can be used for establishing connections (depicted by black dots) both to the public switched telephone network PSTN 118 via the mobile services switching centre 116 and to the packet transmission network 342. In the public switched telephone network 118, a typical terminal 336 is a common telephone or an integrated services digital network ISDN telephone.

A serving GPRS support node SGSN 340 establishes a connection between the packet transmission network 342 and the group switch 320. The serving GPRS support node 340 serves to transmit packets between the base station system and a gateway GPRS support node GGSN 344, and to keep a record of the subscriber terminal's 104 location in its area.

The gateway GPRS support node 344 connects a public packet transmission network 346 and the packet transmission network 342. The gateway GPRS support node 344 hides by packaging the inner structure of the packet transmission network 342 from the public packet transmission network 346, whereby the public packet transmission network 246 regards the packet transmission network 342 as a subnetwork. The public packet transmission network can direct packets to and receive packets from the subscriber terminal 104 located in the packet transmission network.

The packet transmission network 342 is typically a private network which employs the Internet protocol and conveys signalling and tunnelled user data. The structure of the network 342 can vary operator-specifically both by its architecture and protocols below the Internet protocol layer.

The public packet transmission network 346 can be, for example, the global Internet network. A terminal 348, for example a server computer, connected to the public packet transmission network, is to transfer packets to the subscriber terminal 104.

Although the invention has been described above with reference to the example in accordance with the accompanying drawings, it is obvious that the invention is not restricted thereto but it can be varied in many ways within the scope of the inventive idea disclosed in the attached claims.

What is claimed is:

1. A method for controlling load in a telecommunication system including a network part, at least one subscriber terminal and a telecommunication connection between the network part and the subscriber terminal, the method comprising:

using the telecommunication connection for connection setup and data transfer, the telecommunication connection including a channel for relaying channel allocation requests transmitted by the subscriber terminal to the network part, and controlling the telecommunication system load by adjusting the capacity of the channel used for relaying the channel allocation requests and decreasing channel capacity when a base station system becomes overloaded, and when the load drops to a desired level, increasing the channel capacity.

2. A method as claimed in claim 1, further comprising configuring a logical packet associated control channel PCCCH for the resource of a packet data channel PDCH including the telecommunication connection, the PDCH resource including a logical PCCCH channel divided into an uplink resource and downlink resource, the uplink resource being divided between packet random access channel PRACH, a packet data traffic channel PDTCH and a packet associated control channel PACCH, and the uplink resource, which is not fixedly configured as the PRACH channel, being dynamically allocated to the PRACH, PDTCH and PACCH channels.

3. A method as claimed in claim 2, further comprising indicating a resource part to be allocated to the PRACH channel by means of the downlink resource of the PCCCH channel and by relaying uplink state flag information to a radio path in each downlink radio block of the PDCH resource included by the logical PCCCH channel, wherein the uplink state flag information of the downlink radio block has a certain predetermined idle mode value, whereby the next uplink radio block in turn is used as the PRACH channel.

4. A method as claimed in claim 2, further comprising:

indicating the resource part to be allocated to the PRACH channel by means of the PCCCH downlink resource, and relaying the uplink state flag information to the radio path in each downlink radio block of the PDCH resource included by the logical PCCCH channel, wherein the uplink state flag information of the downlink radio block has another value than a certain predetermined idle mode value, and the uplink state flag information has such a value that the subscriber terminal is unable to use the channel as the PRACH channel.

5. A method as claimed in claim 2, further comprising:

indicating the resource part to be allocated to the PRACH channel by means of the downlink resources of the PCCCH channel, and relaying the uplink state flag information to the radio path in each downlink radio block of the PDCH resource included by the logical PCCCH channel, wherein the USF information of the downlink radio block has another value than a certain predetermined idle mode value, whereby the uplink packet traffic of the PDTCH and the PACCH channels of the subscriber terminal allocated to the PDCH resource concerned is controlled by the uplink state flag information, and the uplink state flag information has such a value that the subscriber terminal is unable to use the channel as the PRACH channel.

6. A method as claimed in claim 1, further comprising measuring continually the base station system's processor load or the signalling load between the base station and the base station controller.

7. A method as claimed in claim 1, wherein the method is utilized in the base station and/or the base station controller.

8. A method as claimed in claim 1, wherein the method is primarily employed in the base station and/or the base station controller, to which a high PRACH capacity is configured.

9. A telecommunication system comprising:

a network part, at least one subscriber terminal, and a telecommunication connection between the network part and the subscriber terminal, and wherein a base station system is arranged to use the telecommunication connection for connection setup and data transfer, the telecommunication connection includes a channel for relaying channel allocation requests transmitted by the subscriber terminal to the network part, and the telecommunication system is arranged to control load by adjusting the capacity of the channel used for relaying the channel allocation requests, wherein when the base station system becomes overloaded, the telecommunication system is arranged to decrease PRACH (Packet Random Access Channel) channel capacity and when the load drops to a desired level, the telecommunication system is arranged to increase the PRACH channel capacity.

10. A telecommunication system as claimed in claim 9, wherein the telecommunication system is arranged to configure a logical packet associated control channel PCCCH for the resource of a packet data channel PDCH comprised by the radio connection, the PDCH resource includes a logical PCCCH channel divided into an uplink resource and downlink resource, the uplink resource being divided between the PRACH channel, a packet data traffic channel PDTCH and a packet associated control channel PACCH, and the uplink resource, which is not fixedly configured as the PRACH channel, being dynamically allocated to the PRACH, PDTCH and PACCH channels.

11. A telecommunication system as claimed in claim 10, wherein the telecommunication system is arranged to indicate a resource part to be allocated to the PRACH channel by means of the downlink resource of the PCCCH channel, the system is arranged to relay uplink state flag information to a radio path in each downlink radio block of the PDCH resource included by the logical PCCCH channel, and the uplink state flag information of the downlink radio block has a certain predetermined idle mode value, whereby the telecommunication system is arranged to use the next uplink radio block in turn as the PRACH channel.

12. A telecommunication system as claimed in claim 10, wherein the system is arranged to indicate the resource part to be allocated to the PRACH channel by means of the downlink resources and to relay the uplink state flag information to the radio path in each downlink radio block of the PDCH resources included by the logical PCCCH channel, the uplink stage flag information of the downlink radio block has another value than a certain predetermined idle mode value, and the USF information has such a value that the subscriber terminal is unable to use the channel as the PRACH channel.

13. A telecommunication system as claimed in claim 10, wherein the system is arranged to indicate the resource part to be allocated to the PRACH channel by means of the downlink resource of the PCCCH channel, and arranged to relay the uplink state flag information to the radio path in each downlink radio block of the PDCH resource included by the logical PCCCH channel, the downlink radio block uplink state flag information has another value than a certain predetermined idle mode value, whereby the telecommunication system is arranged to control the uplink packet traffic of the PDTCH and the PACCH channels of the subscriber terminal allocated to the PDCH resource concerned by the uplink state flag information, and the uplink state flag information has such a value that the subscriber terminal is unable to use the channel as the PRACH channel.

14. A telecommunication system as claimed in claim 9, wherein the system is arranged to measure continually the base station system's processor load or the signaling load between the base station and the base station controller.

* * * * *